T. COMEAU.
SPRING TIRE.
APPLICATION FILED NOV. 13, 1915.
1,190,263.
Patented July 11, 1916.
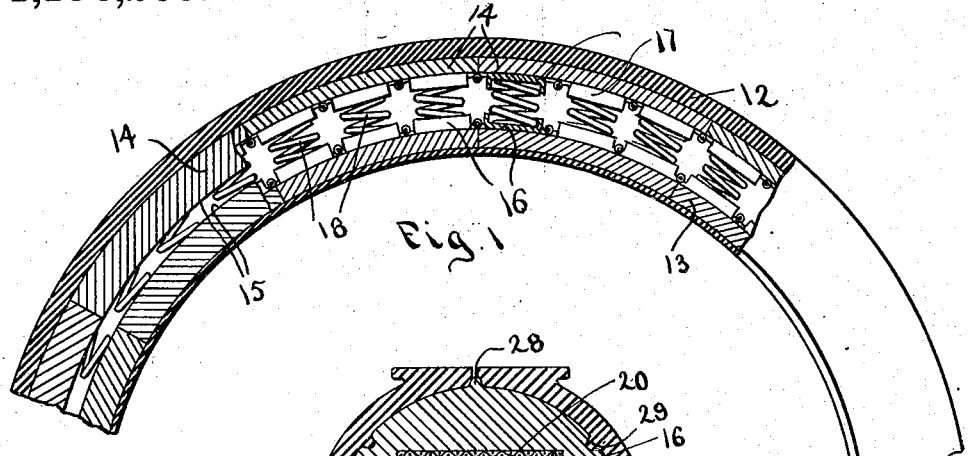
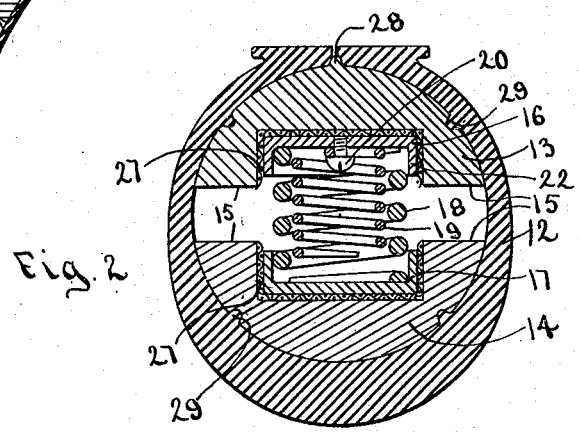
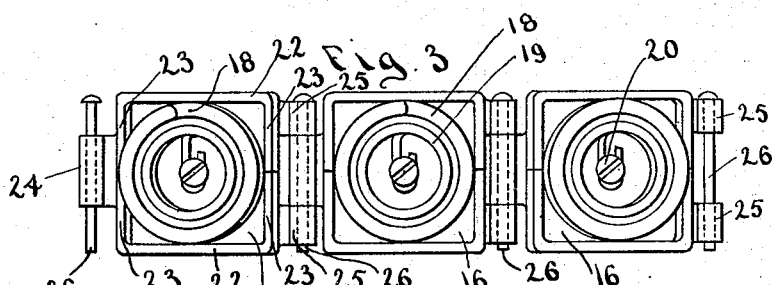
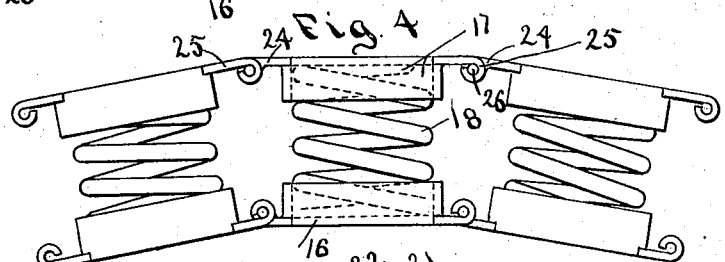
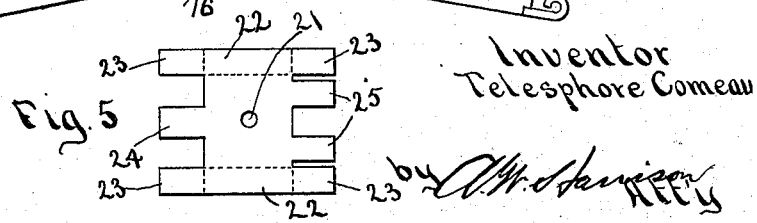
Inventor
Telesphore Comeau

UNITED STATES PATENT OFFICE.

TÉLESPHORE COMEAU, OF LAWRENCE, MASSACHUSETTS.

SPRING-TIRE.

1,190,263.  Specification of Letters Patent.  Patented July 11, 1916.

Application filed November 13, 1915. Serial No. 61,234.

*To all whom it may concern:*

Be it known that I, TÉLESPHORE COMEAU, a subject of the King of Great Britain, and residing in Lawrence, in the county of Essex and State of Massachusetts, have invented certain new and useful Improvements in Spring-Tires, of which the following is a specification.

This invention relates to tires for motor vehicles and particularly to that type known as spring tires.

The object of the invention is to provide an improved practical, durable and economical substitute for the usual inflatable inner tube used in pneumatic tires, and to this end the invention consists in the improvements hereinafter described and claimed.

Figure 1 is a side elevation and part longitudinal section of a portion of a tire embodying my improvements. Fig. 2 represents a transverse section. Fig. 3 is a detail plan of a few of the interlinked spring-seats. Fig. 4 is a detail side elevation of the inner and outer spring-seats and the interposed springs. Fig. 5 is a plan view of a blank to be shaped to form a spring-seat. Figs. 2 to 5 inclusive are on a larger scale than Fig. 1.

Similar reference characters designate similar parts in all of the views.

Confined within an outer shoe 12 of any well-known or preferred form and structure are inner and outer pads 13, 14, respectively. While either or each of these pads might consist of a single strip, I prefer to make them in sections, for convenience in manufacture and assembling, and to enable a new section to be substituted for a worn or badly damaged one.

The pads are made of suitable elastic material such as rubber, or cork composition, or any equivalent material. In cross section they are segmental or, in other words, less than semi-cylindrical, so that when placed as illustrated in the drawings, with the springs hereinafter described between them, there will be an air space between the inner and outer pads, said air space being continuous around the tire.

The surfaces of the pads which form opposite walls of the air space are longitudinally grooved or recessed to accommodate the springs and the interlinked series of metal pockets which form seats for the ends of the springs. The surfaces of the pads at the sides of the grooves or recesses form abutting faces 15 of substantial width. That is, the faces 15 are of such width that if the weight or load should be such that under some conditions of use the outer pad is forced into contact with the inner pad, against the opposition of the air and the springs between the pads, the side portions of the pads which so abut are of sufficient width to possess a resisting capacity that will prevent damage to the springs.

Seated in the longitudinal grooves or recesses of the pads are inner and outer pockets 16, 17, respectively, between which are confined, under some normal compression if preferred, coil springs 18, the ends of the springs being secured by suitable fastenings, such as screws 20, or any preferred form of clip.

The pockets or seatings of each series are linked together to form an endless chain, the inner chain being, of course, of somewhat less length or diameter than the outer one. A preferred form of structure will be understood by comparing Figs. 3, 4 and 5, the latter illustrating the blank of sheet steel, before being shaped for use. The body or substantially flat portion is provided with a hole 21 for a screw 20 or other fastening. The walls which inclose the end coil of a spring are provided by bending up two side portions 22 at a right angle and then bending extensions 23 of the said side portions toward each other. At one end the blank has a tongue 24 and at the other end two tongues 25, 25. These tongues are rolled to form eyes for pintles 26 whereby the several pockets or seatings are hinged together.

By the direct linking or hinging of the spring seats or pockets together, any pressure which acts to compress a seat 17 toward a seat 16 is partially opposed by the springs of the adjacent seats. That is, the springs of adjacent pairs of seats coöperate with each other in resiliently distributing the resistance to pressure. This would not be the case if there were extra links between the spring seats 17 because such extra links would simply rock or yield without transmitting any movement to compress adjacent springs. To effect the desired result of aiding any one spring by adjacent springs, it is essential that the links shall be directly pivoted together and that every link of the outer series 17 shall be supported by a spring, and that all links shall be alike and all springs equal to each other in capacity to resist pressure.

To supplement the action of springs 18, I may employ coil springs 19 within the springs 18, and connected only to the inner pockets 16. The springs 19 are of less length than springs 18 so as to be unaffected by compression due to only ordinary loads or pressure on the tire, but to supply extra spring resistance if the load or pressure should be such as to cause the pockets of the outer series to approach those of the inner series to an excessive degree. The springs 19 are not absolutely essential however, and may be omitted, and therefore I only illustrate such springs in Figs. 2 and 3.

The bottoms of the grooves in the pads are preferably faced with suitable wear-resisting material 27 such as strips of canvas.

To counteract any tendency of the pad sections to work out of position laterally or rotatively within the outer shoe 12, a rib 28 projecting from pad 13 between the edges of the shoe may be employed, or the shoe may have ribs 29 projecting from its inner surface into the pads.

Having now described my invention, I claim:

1. A tire comprising an outer shoe, inner and outer pads within the shoe and spaced from each other to provide an air chamber, and springs for normally preserving the pads in spaced relationship, the outer shoe completely inclosing the pads and in cross section presenting a substantially cylindrical inner wall, the pads being of elastic material and externally formed to closely fit the inner wall of said shoe to prevent the passage of air between the contacting surfaces of the pads and shoe, the inner faces of the pads having metallic pockets inclosing the ends of the springs and preventing them from shifting, the said pockets being directly connected together to prevent one from yielding without transmitting movement to adjacent spring-holding pockets.

2. A tire comprising an outer shoe, inner and outer pads within the shoe and spaced from each other to provide an air chamber, radially arranged coiled springs between the pads, and an endless series of seats for the outer ends of the springs, said seats being directly pivoted together, the pads closely fitting the interior of the shoe and having opposing abutting faces relatively spaced to permit them to contact with each other and prevent excessive collapsing of the springs.

3. A tire comprising an outer shoe, inner and outer pads within the shoe and spaced from each other to provide an air chamber, radially arranged coiled springs between the pads, and an endless series of seats for the outer ends of the springs, said seats being directly pivoted together, each of said seats comprising a plate having two of its marginal portions bent to form walls to confine the end of a spring and having its other two marginal portions bent to form eyes for a pintle.

4. A tire comprising an outer shoe, inner and outer pads within the shoe and spaced from each other, the opposing faces of the pads having longitudinal grooves, inner and outer links directly hinged together and lying in said grooves, and a pair of coiled springs secured to each inner link and adapted to oppose movement of an outer link toward an inner link, one of the springs of each pair being shorter than the other.

In testimony whereof I have affixed my signature.

TÉLESPHORE COMEAU.

Copies of this patent may be obtained for five cents each, by addressing the "Commissioner of Patents, Washington, D. C."